US005951777A

United States Patent [19]

Nurmi et al.

[11] Patent Number: 5,951,777

[45] Date of Patent: Sep. 14, 1999

[54] CRYSTALLIZATION METHOD

[75] Inventors: Juha Nurmi, Pinjainen; Olli-Pekka Eroma, Kotka, both of Finland

[73] Assignee: Xyrofin Oy, Helsinki, Finland

[21] Appl. No.: 09/072,463

[22] Filed: May 5, 1998

[30] Foreign Application Priority Data

May 5, 1997 [FI] Finland .................................... 971914

[51] Int. Cl.[6] ............................. C12K 13/00; C13F 1/02; B01D 9/02

[52] U.S. Cl. ................................................ 127/61; 127/60

[58] Field of Search .......................................... 127/60, 61

[56] References Cited

U.S. PATENT DOCUMENTS 5,340,403 8/1994 Fields et al. .............................. 127/60

FOREIGN PATENT DOCUMENTS 97625 9/1996 Finland .
1 245 486 9/1971 United Kingdom .
WO 96/27029 9/1996 WIPO .
WO96/27028 9/1996 WIPO .

OTHER PUBLICATIONS

Ullmann's Encyclopedia of Industrial Chemistry, Fifth, Completely Revised Edition, vol. B2: Unit Operations I, "Continuous Crystallizers":3–23, No date available.

*Primary Examiner*—David Brunsman
*Attorney, Agent, or Firm*—Scully, Scott, Murphy & Presser

[57] ABSTRACT

The invention relates to a method for the recovery of xylose from xylose-containing aqueous solutions that contain over 30% by weight of xylose on dissolved dry solids. The solution is evaporated at low pressure to a solution supersaturated in respect of xylose, the solution is seeded, and the evaporation is continued at the boiling point of the solution until a crystal mass is obtained in which the xylose yield is 1 to 60%, and the xylose crystals are recovered.

25 Claims, No Drawings

CRYSTALLIZATION METHOD

The invention relates to a method for the recovery of xylose by crystallization from solutions containing over 30% by weight of xylose on dissolved dry solids. In particular, the invention relates to a method for the recovery of xylose in the form of a crystalline product.

In the invention, a xylose-containing solution is evaporated to supersaturation at the boiling point of the solution, the solution is seeded, and the evaporation is continued at the boiling point of the crystallization mass to obtain a crystallization mass with a crystal yield of 1 to 60% on xylose and a dry solids content of over 70% by weight.

Xylose is a valuable raw material, for example, in sweet and spice industries, and particularly as a starting material in the production of xylitol. Xylose is formed in hydrolysis of xylan-containing hemicellulose, for example, in direct acid hydrolysis of biomass, in enzymatic or acid hydrolysis of prehydrolyzate obtained from biomass by prehydrolysis (e.g. with steam or acetic acid), and in cooking processes of the pulp industry. The xylose solutions so obtained have a low disaccharide content, and it is possible to produce xylose solutions whose disaccharide content is advantageous in respect of crystallization, suitably below 4% by weight. Plant materials rich in xylan include, for example, wood material from different tree species, particularly from deciduous trees, such as birch, aspen and beech; different parts of grain (such as straw and husks, particularly husks of corn and barley, and corn cobs), bagasse, coconut shells, skins of cottonseed, etc.

In most known methods, it has been possible to crystallize xylose only if the xylose purity of the solution has been at least about 70% by weight on dry solids. In such cases, it has been necessary to first purify the xylose-containing solution obtained as a result of the hydrolysis of plant-derived material to the required degree of purity by different ultrafiltration, ion exchange, decolouring, ion exclusion, or chromatographic separation methods, or combinations of such methods. Further, auxiliary solvents reducing the solubility of xylose have been employed to crystallize xylose.

An alternative to the above methods for producing a xylose solution with a sufficient purity required for the xylose to crystallize is purification of xylan prior to its hydrolyzation to xylose. In that case, it is expedient to pre-purify the material to be treated (e.g. removal of starch, pectin, proteins, lignin, etc.), followed by extraction with KOH or NaOH solutions, and separation of hemi-cellulose from the solutions by precipitation. According to German Patent 834,079 (Koch, H.), preferably a weakly basic solution, such as a 0.08% ammonium solution, is used in the extraction. Such methods have many steps and are cumbersome, as is apparent, for example, from Browning, B. L., *Methods of wood chemistry, II*, Interscience Publishers, New York, 1967, and Fry, S. C., *The Growing Plant Cell Wall: Chemical and Metabolic Analysis*, Longman Scientific & Technical, England, 1988.

A large quantity of xylose is produced, for example, in sulphite cooking in the pulp industry when hardwood raw material is used. Separation of xylose from such cooking liquors is described e.g. in U.S. Pat. No. 4,631,129 (Heikkilä, H.; Suomen Sokeri Oy). The method disclosed in this patent comprises two chromatographic separations, after which xylose can be recovered subsequent to the evaporation of the product fraction (xylose purity about 70% or more) by crystallization.

Acid hydrolysis of xylan-containing material to produce xylose is disclosed, for example, in U.S. Pat. Nos. 4,075,406 (Melaja, A. J. & Hämäläinen, L.; Suomen Sokeri Oy) and 5,084,104 (Heikkilä, H. & Hyöky, G.; Cultor Ltd), and in the publications incorporated therein by reference. The hydrolysis is based on purification of a hydrolyzate by ion exclusion, decolouring, and chromatographic separation methods. Subsequent to the purification treatments xylose can be recovered from the product fraction after its evaporation by crystallization.

U.S. Pat. No. 4,168,988 (Riehm, T. & Hofenk, G; Institut voor Bewaring en Verwerking van Landbouwprodukten) describes production of xylose by hydrolysis of annual plant residues. Besides filtration of the hydrolyzate, the crystallization of xylose requires decolouring and purification of the hydrolyzate by treatment with cation and anion exchange resins.

DE Auslegeschrift 1 643 940 (Eickenmeyer, R. & Scholler, H.) teaches that crystalline xylose is recovered from a hydrolyzate of pentosan-containing and cellulose-containing natural materials by crystallization from a syrup containing at least about 70% of xylose. The syrup is introduced into a crystallizer at a temperature of 60 to 70° C., cooled, and a crystal mass comprising 15 to 33% of crystallized xylose on the amount of xylose introduced into the crystallizer is withdrawn from the crystallizer at 48 to 52° C. Crystals are separated from the crystal mass by centrifugation, and the mother liquor, the amount of which is 300 to 100% of fresh syrup introduced into the system, is combined with the starting material hydrolyzate. The mixture of mother liquor and hydrolyzate so obtained is treated in a cation exchanger and an anion exchanger, and after a subsequent decolouring treatment the mixture is evaporated to obtain a syrup to be introduced into the crystallizer. The method of DE 1 643 940 is thus a typical crystallization-by-cooling method, in which the temperature and supersaturation gradient between the crystallization mass and heat carrier surfaces is unfavourable. The degree of supersaturation is high close to the heat carrier surfaces, and new small crystals (crystal nuclei) are then formed spontaneously. The result is a crystal mass with many small crystals that are difficult to separate. It should also be mentioned that apart from the above cumbersome purification treatments, the method also comprises extensive recycling. The small amount of xylose recovered in one crystallization (i.e. low yield on xylose supplied to the crystallizer) is stated to result from the fact that when the temperature drops below about 48° C., the rate of crystallization becomes very low, because the viscosity of the solution increases essentially with a drop in the temperature.

Khristov, L. P. et al. ["Some Possibilities for Efficient Use of Prehydrolyzates from Viscose-Grade Pulp Manufacture" in *Gidroliznaya i Lesokhimicheskaya Promyshlennost*, No. 6, 1989, pp. 30–31 (English translation: ISSN 0730-8124, *Hydrolysis and Wood Chemistry USSR*, No. 6, 1989, pp. 62 to 66, Allerton Press Inc.), and "Some Possibilities for Using Prehydrolyzates from the Production of Viscose Pulp" in *Pap. a celul.* 45(1990) No. 6, pp. V42 to V44] have studied a method by which both crystalline xylose and glucose isomerase are prepared from a prehydrolyzate obtained from a process of preparing viscose pulp from beech, the glucose isomerase being obtained by biosynthesis with a micro-organism utilizing a xylose substrate. This method also comprises several steps for pre-treatment of the hydrolyzate (use of activated charcoal in hydrolyzing the prehydrolyzate with sulphuric acid, precipitation of colloid particles by vigorous mechanical stirring and neutralisation of the mixture, decolouring with ion exchange resin). After evaporation, xylose can be crystallized from the hydrolyzate purified in this manner.

To crystallize the xylose from xylose-containing solutions, auxiliary solvents reducing the solubility of xylose, such as methanol, ethanol or acetic acid, have also been used. Such an approach is disclosed, for example, in U.S. Pat. No. 3,784,408 (German Offenlegungsschrift 2 047 897; Jaffe, G. M., Szkrybalo, W. & Weinert, P. H.; Hoffmann-La Roche), in which a hydrolyzate is purified by ion exchange, and methanol is added to the evaporated hydrolyzate to crystallize the xylose. U.S. Pat. No. 5,340, 403 (Fields, P. R. and Wilson, R. J.; Zeneca Limited) discloses a method of producing xylose by hydrolyzing xylan-containing raw material, separating the xylose-containing medium, concentrating it to a syrup containing 20 to 40% by weight of water, and adding ethanol to the syrup to crystallize the xylose. U.S. Pat. No. 3,780,017 (Spalt, H. A. et al.; Masonite Corporation) teaches that impurities are precipitated from the concentrated hydrolyzate with a water-soluble alcohol, and after evaporation of the alcohol solution acetic acid is added to the solution to crystallize the xylose.

The most effective known method for the recovery of xylose is disclosed in Finnish Patent Publication 97,625 (Lindroos, M., Heikkilä, H. and Nurmi, J.; Xyrofin Oy), which teaches a method for the recovery of xylose from solutions with a relatively low xylose content, i.e. 30 to 60% by weight on dissolved dry solids, by supersaturating a xylose-containing solution that contains 30 to 60% by weight of xylose on dissolved dry solids in respect of xylose. To achieve this, the xylose is crystallized by lowering the temperature of the solution, and the xylose crystals are recovered. The solution to be treated is supersaturated by subjecting it to evaporation at low pressure; the desired supersaturation can also be achieved by cooling. In a preferred embodiment, the solution is evaporated to a dry solids content of 75 to 90% by weight. If the xylose purity of the solution to be treated is within the range of 30 to 50%, then the dry solids content of the supersaturated solution is preferably 82 to 95% by weight, particularly advantageously 83 to 92% by weight. If the xylose purity of the solution to be treated is within the range of 40 to 60%, then the dry solids content of the supersaturated solution is preferably 75 to 89% by weight, particularly advantageously 78 to 86% by weight. Seeding is not performed during evaporation. The method of FI 950 957, however, requires long cooling, and problems at the beginning and end of the crystallization lead to varying results in the crystal yield.

The invention relates to a method for crystallization of xylose from a xylose solution containing over 30% by weight of xylose on dissolved dry solids by supersaturating the solution in respect of xylose and crystallizing the xylose from the solution. Preferably the xylose solution contains at least about 50% of xylose on dry solids. The method of the invention is characterized in that the xylose-containing solution is evaporated to supersaturation at the boiling point of the solution, i.e. at 40 to 80° C., the solution is seeded, and the evaporation is continued at the boiling point of the crystallization mass (i.e. mixture of the supersaturated solution and crystals), until a crystallization mass is obtained in which the crystal yield is 1 to 60% on xylose, and the dry solids content of the mass is over 70% by weight. The temperature and supersaturation gradient between the heat carrier surface and the crystallization mass is advantageous. Any small crystals may grow, and formation of any new crystal nuclei can be avoided, unlike in crystallization by cooling. The rate of crystallization is high, since the temperature is suitable and the viscosity of the mother liquor is low, i.e. mass and heat transport are efficient because of boiling. The pH of the xylose-containing solution is preferably 2 to 7, and the disaccharide content is below 4% on dry solids. The evaporation is preferably carried out at 50 to 70° C.

In the invention, the temperature of the crystallization mass is preferably dropped by at least 10° C. when the crystallization by evaporation has been terminated. The crystallization mass is preferably cooled for 10 to 50 hours. Further, in a preferred embodiment the mass can be heated before the recovery of the crystals to facilitate the recovery. Alternatively, the mass can be diluted by adding water or a xylose-containing solution.

The method of the invention makes it very easy to control the crystal size. Also, better output (kg crystals/$m^3$ crystallization mass/h) and yield, and better crystal quality are achieved. Surprisingly, centrifugation of the mass is easy, both with a batch centrifuge and with a continuous centrifuge.

In the specification and claims, supersaturation of a solution (apparent supersaturation) in respect of xylose means a dimensionless ratio of the measured xylose content to the solubility of xylose, the ratio being calculated from the equation:

$$S = \frac{\text{xylose content in solution}}{\text{solubility of xylose at the same temperature}}$$

where s is supersaturation, and the unit of measurement for the xylose content and xylose solubility is g/100 g of water. Also, the terms 'supersaturated' and 'supersaturation' refer in the following to the saturation of the solution in respect of xylose.

An aqueous solution of xylose contains five tautomer forms: α and β-pyranose forms, α and β-furanose forms, and an aldehyde, or open, form. The proportion of these forms depends on the temperature and on the concentration of the solution. Only the α-pyranose form is a crystallizing form (needle-like crystals, melting point 144 to 145° C.). The proportion of the last-mentioned form is reduced as the temperature drops, and so equilibrium reactions also slow down. With the method of the invention, mutarotation conditions that are advantageous in respect of crystallization are maintained. In other words, the temperature prevailing in the vicinity of the heat carrier surfaces during the crystallization is high.

The solution to be treated in accordance with the method of the invention is supersaturated by evaporation at low pressure. In a preferred embodiment of the invention, the solution is evaporated to a dry solids content of 80 to 90% by weight. The xylose purity of the solution to be treated is preferably at least 50%, and the disaccharide content is below 4% by weight.

To form xylose crystals from a supersaturated solution, seeding is employed. In such a method, the amount and crystallizing ability of the solution to be treated affect the way that xylose crystals are formed. As seed crystals, it is possible to use a particulate xylose powder.

The seed crystals are added to the solution during the evaporation when suitable supersaturation has been achieved. A suitable seeding supersaturation is 1.05 to 1.7, depending on the quality of the solution. The suitable amount of seed crystals is 0.001 to 1.0% by weight on xylose of the crystallization mass, depending on the seed quality and the size of the seed crystals. Preferably, the supersaturation of the solution in respect of xylose during the crystallization is 1.1 to 1.4. During crystallization by evaporation, the apparent viscosity of the crystallization mass is within the range of 1 to 50 Pa. The suspension is cooked and agitated, until a sufficient degree of crystallization (yield, reduction in xylose purity of the mother liquor, and crystal size) has been achieved. With a crystallization by evaporation lasting 1 to 10 hours, or even less than that, it is possible to achieve a xylose yield of 1 to 60% and a crystal size of 0.05 to 0.5 mm. The temperature of the crystallization mass is preferably dropped to 70 to 20° C. when the crystallization by evaporation has been terminated. Usually, cooling is effected for 20 to 50 hours, or less than that, e.g. 10 hours, and to a temperature of 50 to 30° C., preferably 45 to 40° C., i.e. at a rate 0.3° C./h to 5° C./h.

If necessary, the supersaturation of the crystallization mass is reduced by raising the temperature and/or diluting the crystallization mass with water or a xylose-containing solution, so that the viscosity of the crystallization mass drops sufficiently for effective separation of crystallized material. Typically, the viscosity of a crystallization mass is then 5 to 50 Pa. The crystals can be separated, for example, by filtration, decantation, centrifugation, etc., but preferably by centrifugation. The xylose content of the crystal fraction obtained is typically over 90%.

Preferred embodiments of the method of the invention will be described in greater detail by the following examples, which are not to be construed as limiting the scope of the invention.

The analysis results given in the examples have been obtained as follows:

The dry solids contents were determined refractometrically (RK) or by the Karl Fisher titration method (DS).

Carbohydrates were analyzed by liquid chromatography (HPLC), employing columns in which the ion exchange resins were in the $Na^{+}$and $Pb^{2+}$ forms, or by PEDLC (i.e. HPLC with a pulse electrochemical detector). The oligosaccharides mentioned in the test results also include the disaccharides. The colour was determined by the ICUMSA method [see *Sugar A and Tentative Methods Recommended by the International Commission for Uniform Methods of Sugar Analysis* (*ICUMSA*), ed. Schneider, F., ICUMSA, Peterborough, England, 1979, pp. 125 to 128] at a pH of 5 and by performing the measurement from a filtered solution (0.45 μm) at 420 nm. In the specification and the attached claims, xylose purity means the proportion of xylose in the dry solids contained in the solution or mixture. The purity is indicated as % by weight unless stated otherwise.

EXAMPLE 1

The xylose-containing solution to be treated was a xylose solution (810 I, 44% by weight, 405 kg of dry solids, pH 3.7) made of a sulphite liquor chromatographically concentrated in respect of xylose; the solution contained 62.4% of xylose and 1.7% of oligosaccharides, on dry solids. The solution was evaporated with a 400-litre batch evaporating crystallizer at a pressure of 120 to 140 mbar, maintaining a temperature of about 70° C. and a solution volume of 120 I, and simultaneously supplying additional solution. The dry solids content and supersaturation of the solution were raised evenly during the evaporation.

When a supersaturation of 1.25 (apparent) was achieved at 70.5° C., 16 g of powdery dry xylose was added (average grain size 15 μm). Immediately after seeding, a 2.5-hour crystallization-by-evaporation step was started, simultaneously supplying more solution. This increased the volume, yield and crystal size of the crystallization mass. During the crystallization step, the dry solids content of the crystallization mass varied between 86.5 and 89.1%, and the temperature between 68.5 and 70.5° C. At the end of the crystallization step, when the batch volume had been achieved, the dry solids content of the mass was 86.5%, xylose yield 13% and typical crystal size 0.1 to 0.2 mm. The crystallization mass was transferred to a cooling crystallizer, where it was cooled to 57° C. in 22 hours. The separation of crystals by centrifugation was performed at 41° C. with a batch centrifuge. The xylose yield in the crystallization mass was 53%. The time of centrifugation was 5 min, and 5.7% of washing water on the weight of the crystallization mass was used. The mass was easy to centrifuge. The xylose purity of the crystal was 99.1%, and the yield was 42% on xylose.

EXAMPLE 2

The xylose-containing solution to be treated was a neutralised acid hydrolyzate liquor made from birch chips and chromatographically concentrated in respect of xylose; xylose had been crystallized from the liquor once. The solution contained 61.3% of xylose on dry solids (RK). The solution was evaporated with a 30 $m^3$ batch evaporating crystallizer at low pressure, maintaining a temperature of 50° C. and a solution volume of 22 $m^3$, and simultaneously supplying more solution.

When a supersaturation of 1.7(apparent) was achieved at 50° C., 1 kg of powdery dry xylose was added. Immediately after seeding, an about 7-hour crystallization-by-evaporation step was started, simultaneously supplying more solution, whereby the volume, yield and crystal size of the crystallization mass were increased. During the crystallization step, the temperature of the crystallization mass varied between 50 and 55° C. At the end of the crystallization step, when the batch volume had been achieved, the dry solids content of the mass was 86%, xylose yield 20% and typical crystal size 0.05 mm. The crystallization mass was transferred to a cooling crystallizer, where it was cooled to about 30° C. in 50 hours, and the crystals were separated from the mother liquor with a continuous centrifuge. Before the centrifugation, the crystallization mass was heated by about 50° C. The mass was easy to centrifuge. The xylose purity of the crystal was 91.7% and that of the run-off 44.8.%.

EXAMPLE 3

The xylose-containing solution to be treated was a sulphite cooking liquor (550 I, 58% by weight, 390 kg of dry solids, pH 3.3) chromatographically concentrated in respect of xylose; the liquor contained 61.5% of xylose and 0.9% of oligosaccharides, on dry solids. The solution was evaporated with a 400-litre evaporating crystallizer at a pressure of about 125 mbar, maintaining a temperature of 65° C. and a solution volume of 120 I, and simultaneously supplying more solution, in the same way as in Example 1.

When a supersaturation of 1.15(apparent) was achieved at 65° C., 8 g of powdery dry xylose was added (average grain size 15 μm). Immediately after seeding, an about 2-hour crystallization-by-evaporation step was started, simultaneously supplying more solution, whereby the volume, yield and crystal size of the crystallization mass were increased. During the crystallization step, the dry solids content of the crystallization mass varied between 84 and 88%, and the temperature between 67.5 and 70.0° C. At the end of the crystallization step, when the batch volume had been achieved, the dry solids content of the mass was 88%, xylose yield 11% and typical crystal size 0.05 to 0.1 mm. The crystallization mass was transferred to a cooling crystallizer, where it was cooled to 40° C. in 40 hours, and the crystals were separated from the mother liquor with a batch centrifuge. The xylose yield in the crystallization mass was 62%. The centrifugation time was 5 min, and 6.8% of washing water on the weight of the crystallization mass was used. The mass was easy to centrifuge. The xylose purity of the crystal was 93%, and the yield was 59% on xylose. When 15% of washing water was used, the xylose purity of the crystal was 98%, and the yield was 49% on xylose.

EXAMPLE 4

The xylose-containing solution to be treated was prepared by dissolving in water 335 kg of a crystal mass crystallized and filtered by a method described in Finnish Patent Application 950,957 from a xylose fraction that had been chromatographically concentrated from an Mg cooling liquor. The volume of the solution was 500 I, dry solids content 54% by weight, and pH 3.1. The solution contained 71.6% of xylose and 0.7% of oligosaccharides, on dry solids. The solution was evaporated with a 400-litre batch evaporating crystallizer at a pressure of about 150 mbar, maintaining a temperature of 65° C. and a solution volume of 120 I, and simultaneously supplying more solution. The dry solids content and supersaturation of the solution were raised evenly during the evaporation.

When a supersaturation of 1.05 (apparent) was achieved at 65° C., 30 g of powdery dry xylose was added (average grain size 15 $\mu$m). Immediately after seeding, a 6-hour crystallization-by-evaporation step was started, simultaneously supplying more solution, whereby the volume, yield and crystal size of the crystallization mass were increased. During the crystallization step the dry solids content of the crystallization mass varied between 81 and 89%, and the temperature between 65 and 69° C. At the end of the crystallization step, when the batch volume had been achieved, the dry solids content of the mass was 88%, xylose yield 36%, and typical crystal size 0.3 mm. The crystallization mass was transferred to a cooling crystallizer, where it was cooled to 40° C. in 25 hours, and the crystals were separated from the mother liquor with a batch centrifuge. The centrifugation time was 5 min, and no washing water was used. The mass was easy to centrifuge. The xylose purity of the crystal was 97%, and the yield was 74% on xylose.

EXAMPLE 5

The starting material was a crystal mass crystallized and separated by centrifugation from a fraction that had been chromatographically concentrated from a sulphite waste liquor by a method described in Finnish Patent Application 950,957. The crystal mass was dissolved in excess in 60° C. water. The dry solids content of the solution was about 60% by weight, and temperature 60° C. The solution was evaporated with a 30 $m^3$ batch evaporating crystallizer at low pressure, maintaining a temperature of 60° C. and a solution volume of 15 $m^3$, and simultaneously supplying more solution. The dry solids content and supersaturation of the solution were raised evenly during the evaporation.

When a supersaturation of 1.16 (apparent) was achieved at 0° C., 4 kg of powdery dry xylose was added (average grain size 15 $\mu$m). Immediately after seeding, an about 6-hour crystallization-by-evaporation step was started, simultaneously supplying more solution, whereby the volume, yield and crystal size of the crystallization mass were increased. During the crystallization step the dry solids content of the crystallization mass rose from 74% (RK) to 86%, and the temperature was 60 to 65° C. At the end of the crystallization step, when the batch volume had been achieved, the dry solids content of the mass was 86%, xylose yield 50%, and typical grain size 0.25 mm. The crystallization mass was transferred to a cooling crystallizer, where it was cooled to 58° C. in 22 hours, and the crystals were separated from the mother liquor with a batch centrifuge. The mass was easy to centrifuge, and the yield was 60% on xylose.

I claim:

1. A method of crystallizing xylose from a xylose solution that contains over 30% by weight of xylose on dissolved dry solids by supersaturating the solution in respect of xylose and crystallizing the xylose from it, characterized in that the xylose-containing solution is evaporated to supersaturation at the boiling point of 40 to 80° C. of the solution, the solution is seeded, and the evaporation is continued at the boiling point of the crystallization mass, until a crystallization mass is obtained which has a crystal yield of 1 to 60% on xylose, and a dry solids content of over 70%.

2. A method according to claim 1, characterized in that the pH of the xylose-containing solution is 2 to 7.

3. A method according to claim 1, characterized in that the xylose-containing solution has a disaccharide content of less than 4% by weight on dry solids.

4. A method according to claim 1, characterized in that the xylose solution is a xylose-containing hydrolyzate of biomass.

5. A method according to claim 1, characterized in that the xylose solution is a xylose-containing by-product fraction obtained in wood-processing industry, for example a sulphite cooking liquor or a part thereof, or a concentrate obtained therefrom.

6. A method according to claim 5, characterized in that the xylose solution is a concentrate obtained from a sulphite cooking liquor by chromatography.

7. A method according to claim 5, characterized in that the xylose solution is a pre-hydrolyzate fraction of a sulphate cooking liquor, or a post-hydrolyzate of same.

8. A method according to claim 1, characterized in that the pH is 3to 4.

9. A method according to claim 1, characterized in that more xylose-containing solution is supplied to the system during the evaporation and the crystallization by evaporation.

10. A method according to claim 1, characterized in that the evaporation is performed at 50 to 70° C.

11. A method according to claim 1, characterized in that 0.001 to 1% by weight of particulate xylose powder on the xylose of the crystallization mass is added as seed crystals.

12. A method according to claim 1, characterized in that when the crystallization by evaporation has been terminated, the temperature of the crystallization mass is dropped to 70 to 20° C.

13. A method according to claim 12, characterized in that the crystallization mass is cooled for 10 to 50 hours.

14. A method according to claim 13, characterized in that the crystallization mass is cooled to 50 to 30° C.

15. A method according to claim 13, characterized in that the crystals obtained are re-crystallized.

16. A method according to claim 1, characterized in that the xylose solution contains at least about 50% of xylose on dry solids.

17. A method according to claim 16, characterized in that the supersaturation of the solution in respect of xylose during the crystallization is 1.1 to 1.4.

18. A method according to claim 16, characterized in that the supersaturation of the solution in respect of xylose during the seeding 1.05 to 1.7.

19. A method according to claim 16, characterized in that the crystals are recovered by centrifugation.

20. A method according to claim 19, characterized in that to facilitate the recovery of the crystals, the crystallization mass is heated.

21. A method according to claim 19, characterized in that to facilitate the recovery of the crystals, the crystallization mass is diluted.

22. A method according to claim 16, characterized in that the crystals obtained are used for preparing a new crystallization mass.

23. A method according to claim 16, characterized in that the crystals are recovered by filtration.

24. A method according to claim 23, characterized in that the crystals obtained are re-crystallized.

25. A method according to claim 23, characterized in that the runoff obtained is crystallized, and the crystal fraction is recovered.

* * * * *